United States Patent
Lee et al.

(10) Patent No.: US 7,124,850 B2
(45) Date of Patent: Oct. 24, 2006

(54) FOUR WHEEL DRIVE ASSEMBLY AND A METHOD FOR UTILIZING THE SAME

(75) Inventors: Syun Kyung Lee, Ann Arbor, MI (US); Ashok Rodrigues, Farmington Hills, MI (US); John Antoni Glab, Riverview, MI (US); Dana Joseph Katinas, Novi, MI (US); Peter James Barrette, Ann Arbor, MI (US)

(73) Assignee: Ford Global Technologies, LLC, Dearbon, MI (US)

( * ) Notice: Subject to any disclaimer, the term of this patent is extended or adjusted under 35 U.S.C. 154(b) by 441 days.

(21) Appl. No.: 09/683,941

(22) Filed: Mar. 5, 2002

(65) Prior Publication Data

US 2003/0168274 A1   Sep. 11, 2003

(51) Int. Cl.
*B60K 17/35* (2006.01)

(52) U.S. Cl. .......................... 180/248; 701/69
(58) Field of Classification Search ............ 180/197, 180/235, 247, 248; 701/81, 82, 89, 90
See application file for complete search history.

(56) References Cited

U.S. PATENT DOCUMENTS

| | | | | |
|---|---|---|---|---|
| 5,407,024 A | * | 4/1995 | Watson et al. | 180/248 |
| 5,631,829 A | * | 5/1997 | Takasaki et al. | 701/69 |
| 5,701,247 A | * | 12/1997 | Sasaki | 701/1 |
| 5,704,444 A | * | 1/1998 | Showalter | 180/247 |
| 5,752,211 A | * | 5/1998 | Takasaki et al. | 701/69 |
| 5,803,197 A | * | 9/1998 | Hara et al. | 701/89 |
| 5,809,443 A | | 9/1998 | Perttunen et al. | |
| 5,839,084 A | * | 11/1998 | Takasaki et al. | 701/67 |
| 5,947,224 A | * | 9/1999 | Kouno | 180/248 |
| 5,954,778 A | | 9/1999 | Rodrigues et al. | |
| 6,062,330 A | * | 5/2000 | Watson et al. | 180/248 |
| 6,094,614 A | * | 7/2000 | Hiwatashi | 701/89 |
| 6,145,614 A | * | 11/2000 | Kimura et al. | 180/248 |
| 6,161,643 A | * | 12/2000 | Bober et al. | 180/249 |
| 6,553,303 B1 | * | 4/2003 | Matsuno | 701/67 |
| 6,729,426 B1 | * | 5/2004 | Suzuki | 701/69 |

* cited by examiner

*Primary Examiner*—Lesley D. Morris
*Assistant Examiner*—L. Lum
(74) *Attorney, Agent, or Firm*—MacMillan, Sobanski & Todd, LLC

(57) ABSTRACT

A four wheel drive assembly 10 including a torque transfer assembly 60 which operates under the control of the controller 62 and which receives and selectively transfers a certain desired amount of torque to a front axles 14, 15 and to the rear axles 14 17. The amount of transferred torque varies depending upon the occurrence of a sensed slip condition the use of a pre-emptive slip control mode of operation in which the controller 62 determines that it is likely that a slip may occur. Particularly, controller 62 is allowed to enter the preemptive mode of operation only after an actual slip has occurred and the controller 62 exits this preemptive mode of operation upon the occurrence of a certain event or condition or upon the passage of a certain amount of time.

8 Claims, 2 Drawing Sheets

FOUR WHEEL DRIVE ASSEMBLY AND A METHOD FOR UTILIZING THE SAME

BACKGROUND OF INVENTION

1) Field of the Invention

The present invention generally relates to a vehicular four wheel drive assembly and to a method for utilizing the same, and more particularly to a vehicular four wheel drive assembly having at least two modes of operation, the first operational mode being effective to sense slip and to selectively transfer torque to at least one axle in response to the sensed slip and the second operational mode also being effective to transfer torque to the at least one axle in response to the occurrence of a certain condition which may increase the likelihood of slip, the second operational mode occurring only after slip has actually occurred or has been detected.

2) Background of the Invention

A four wheel drive assembly typically includes a torque transfer assembly which receives torque from a rotating crankshaft and which transfers at least a portion of the received torque to a first and/or a second driveshaft which are respectively coupled to the front and rear axles. More particularly, the four wheel drive assembly includes a controller which is typically operated under stored program control and one or more sensors which are physically and communicatively coupled to the controller. The controller is operatively coupled to the torque transfer assembly and, upon the occurrence of one or more sensed events or conditions, causes the torque transfer assembly to transfer torque to the front and/or rear axle.

Particularly, should one of the axles (or the wheels which are mounted upon the one axle) rotate at a speed which is greater than the speed of a second of the axles or the wheels which are mounted upon the second axle (i.e., often referred to as a slip condition), by a certain threshold amount, the controller causes the torque transfer assembly to increase the amount of torque being transferred to one of the moving axles or wheels, such as and without limitation the slower moving axle, and reduce the amount of torque being transferred to the other moving axle or wheels, thereby slowing the speed of the other (e.g., the faster) moving axle and wheels.

A second operating strategy (e.g., a "preemptive" strategy) causes such torque reallocation to occur when certain conditions or events are sensed, in the absence of actual slip. For example, whenever the difference in axle or wheel speeds exceed a certain value and the accelerator member and/or the throttle plate are positioned in a certain manner, torque allocation is achieved. In this manner, the likelihood of the occurrence of slip is reduced.

While the second operating strategy does desirably decrease the likelihood of slip from occuring, it suffers from some drawbacks. For example and without limitation, the second strategy is employed whenever the vehicle is activated or "running" and the provided torque allocation is dependent only upon vehicular speed and the position of one or more certain components. As such, this strategy is often utilized even when there is very little likelihood of the occurrence of slip, such as when the vehicle is driven upon a surface which maintains a relatively large frictional contact with the wheels of the vehicle (e.g., surfaces having a relatively high coefficient of friction or "μ"). The unnecessary employment of the "torque allocation" strategy unnecessarily increases the amount of fuel used by the vehicle and undesirably increases the amount of noise and vibration which is communicated into the vehicle. It is therefore desirable to employ a preemptive slip operating strategy only when it is relatively likely that slip may occur (e.g., only when the vehicle is being driven upon a surface having a relatively low coefficient of friction).

SUMMARY OF INVENTION

It is a first non-limiting advantage of the present invention to provide a four wheel drive assembly and a method for utilizing the same which overcomes some or all of the previously delineated drawbacks of current assemblies.

It is a second non-limiting advantage of the present invention to provide a four wheel drive assembly and a method for utilizing the same which overcomes some or all of the previously delineated drawbacks of current assemblies and which, by way of example and without limitation, has a first mode of operation and a second preemptive mode of operation which is activated in response to the first mode of operation.

It is a third non-limiting advantage of the present invention to provide a four wheel drive assembly having a preemptive slip control mode of operation which is performed only when the vehicle, containing the four wheel drive assembly, is operated upon a surface having a relatively low coefficient of friction.

According to a first non-limiting aspect of the present invention a four wheel drive assembly is provided and comprises a torque transfer assembly which receives torque and which has a first mode of operation in which the torque transfer assembly selectively transfers a certain amount of the torque to a certain axle upon a sensed slip condition and which further has a second preemptive mode of operation which only occurs after the first mode of operation has occurred.

According to a second non-limiting aspect of the present invention, a four wheel drive assembly having a torque transfer assembly is provided. The assembly includes a controller which is coupled to the torque transfer assembly which senses the presence of a surface having a low coefficient of friction and which has a preemptive slip control mode of operation which is performed only after the presence of the surface is sensed.

According to a third non-limiting aspect of the present invention a method for operating a vehicle is provided for transferring torque to an axle of a vehicle. Particularly, the method includes the steps of sensing slip; and entering a preemptive slip control mode of operation only after the slip has been sensed.

These and other features, aspects, and advantages of the present invention will become apparent from a reading of the detailed description of the invention and by reference to the following drawings.

DETAILED DESCRIPTION

Figure 1:
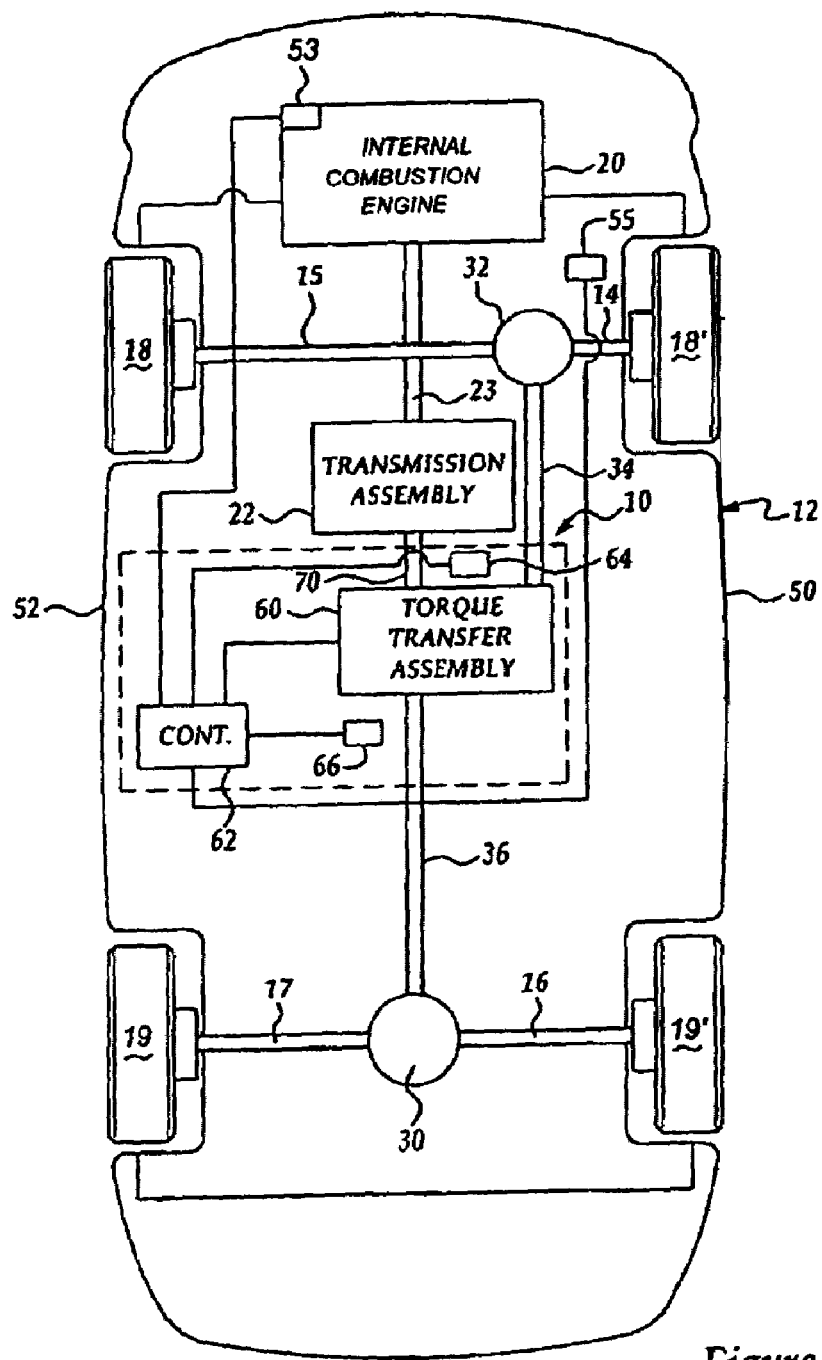
FIG. 1 is a block diagram of a four wheel drive assembly which is made in accordance with the teachings of the preferred embodiment of the invention and which is operatively disposed within a vehicle.

Referring now to FIG. 1, there is shown a four wheel drive assembly 10 which is made in accordance with the teachings of the preferred embodiment of the invention and which is operatively disposed within a vehicle 12.

Particularly, vehicle 12 is of the type having a front pair of axle half-shafts 14, 15 which cooperatively form a front axle (i.e., an axle which is disposed under the driver (not shown)) and a rear pair of axle half shafts 16, 17 which cooperatively form a rear axle. Vehicle 12 further includes front wheels 18, 18' which are respectively attached to half-shafts 15, 14 and rear wheels 19, 19' which are respectively attached to half-shafts 17, 16. Further, vehicle 12 includes a torque generator 20, such as and without limitation an internal combustion engine, and a transmission assembly 22 which is operatively coupled to the torque generator 20, such as by a crankshaft 23. The vehicle 12 further includes a front differential assembly 32 which operatively receives the front axle half-shafts 14, 15, a rear differential assembly 30 which operatively receives the rear axle half-shafts 16, 17, and a pair of substantially identical driveshafts 34, 36 which are respectively coupled to and which extend from the differential assemblies 32, 30.

Vehicle 12 further includes frame members 50, 52 which respectively receive half-shafts 14, 16; and 15, 17, a selectively movable throttle plate 53 which is disposed within the engine 20 and which selectively allows air to enter the various engine cylinders (not shown), and a selectively movable accelerator member 55 whose position is indicative of the desired speed of the vehicle 12 (i.e., the amount of fuel required to be placed with the engine cylinders). While a certain type or configuration of vehicle is shown within FIG. 1, it should be appreciated that the present invention is operable within a wide variety of different types of vehicles and that nothing in this description is meant to limit the use of the present invention to a certain type or a certain vehicular configuration. Moreover, it should be appreciated that only the relevant portions of vehicle 12 are shown within FIG. 1.

The four wheel drive assembly 10 includes a torque transfer assembly, commonly referred as a "transfer case" 60 which is physically and operably coupled to the driveshafts 34, 36, a controller 62 which is operable under stored program control and which is coupled to the torque transfer assembly 60, and several sensors 64, 66 which are physically and communicatively coupled to the controller 62 and which are adapted to respectively sense the speed of the driveshafts 34, 36 and to communicate the respectively sensed speeds to the controller 62. The controller 62 is physically and communicatively coupled to the accelerator member 55 and to the throttle plate 53. As should be known to those of ordinary skill in this art, torque transfer assembly 60 typically comprises one or more electromagnetic clutch assemblies, or other types of torque transfer actuators which, under the supervision and control of the controller 62, causes a certain portion of the received torque to be communicated to the driveshaft 34 and axles 14, 15 through differential assembly 32, and a certain portion of the received torque to be communicated to the driveshaft 36 and the axles 16, 17 through the differential assembly 30. Non limiting examples of such torques transfer assemblies are set forth within U.S. Pat. No. 5,954,778 ("the '778 patent") which is fully and completely incorporated herein by reference, word for word and paragraph by paragraph and U.S. Pat. No. 5,809,443 ("the '443 patent") which is fully and completely incorporated herein by reference, word for word and paragraph by paragraph.

Figure 2:
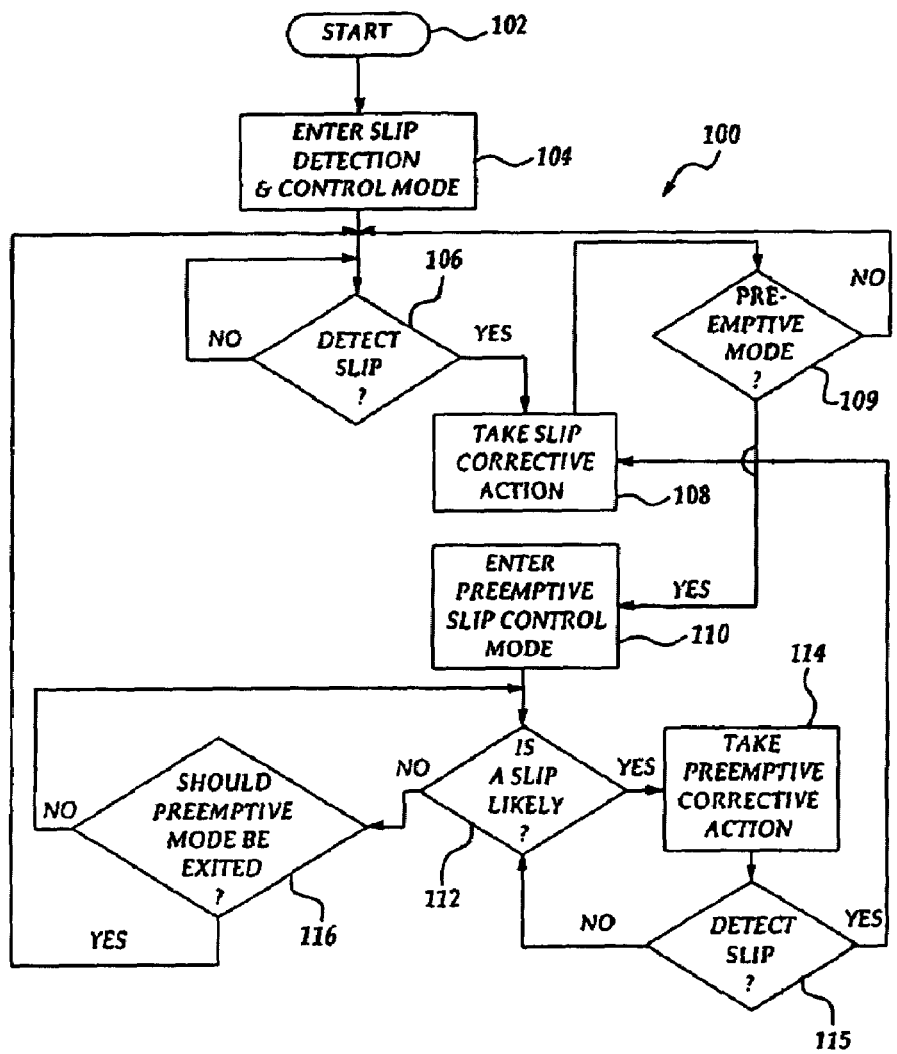
FIG. 2 is a flowchart illustrating the sequence of steps which cooperatively comprise the methodology of the preferred embodiment of the invention and which is utilized by the four wheel drive assembly which is shown in FIG. 1.

In operation, torque, which is produced by the torque generator 20, is communicated to the transmission assembly 22 by the crankshaft 23. The received torque is then communicated to the torque transfer assembly 60 by the driveshaft 70. As previously delineated, a certain first portion of the received torque is then communicated to the driveshaft 34 and a certain second portion of the received torque is communicated to the driveshaft 36 by the torque transfer assembly 60 which performs this torque allocation under the control and supervision of the controller 62. Further, the controller 62 performs the control methodology of the preferred embodiment of the invention, which is shown in FIG. 2. As further delineated below, the methodology 100 of the preferred embodiment of the invention causes the torque transfer assembly 60 to dynamically "re-allocate" or modify the amount of torque which is communicated to the driveshafts 34, 36 in response to an actual slip or to a perceived need to avoid or reduce the likelihood of the occurrence of slip. In another non-limiting embodiment of the invention, the speed of the wheels 18, 18', 19, 19' may be selectively controlled by the controller 62 instead of controlling the driveshafts 34, 36.

Referring now to FIG. 2, there is shown a flowchart or methodology 100 of the preferred embodiment of the invention. Particularly, methodology 100 includes a first step 102 in which the controller 62 is activated/initialized, such as when the vehicle 12 is started or energized. In this step 102 a pre-emptive slip control mode variable or flag is reset or made equal to zero or to logical state of "false".

Step 102 is followed by step 104 in which the controller 62 enters a "slip detection and control mode". Step 106 follows step 104 and, in this step 106, the controller 62, by use of the sensors 64, 66, determines whether slip has occurred or is presently occurring. Particularly, in this step 106, the controller 62 receives the currently measured speed of the driveshafts 34, 36 from the sensors 64, 66 and uses these respective measurements to determine the occurrence of slip (e.g., in the manner set forth in the '778 or '443 patents) and/or to infer the speed of the pair of wheels 18, 18' and the speed of the pair of wheels 19, 19'. Should the difference between the speed of the driveshafis 34, 36 or the first pair of axles 14, 15 and the second pair of axles 16, 17 or the first pair of wheels 18, 18' and the second pair of wheels 19, 19' exceed a certain predetermined threshold, an immediate slip condition is sensed and step 106 is followed by step 108 in which immediate slip control corrective action is taken.

Such corrective action may include the transfer of an increased amount of torque to the driveshaft and to pair of axles which are coupled to the slower moving pair of wheels. The amount of such increased torque transfer may be calculated in a conventional manner by use of the sensed speed differential.

Step 108 is followed by step 109 in which controller 62 determines whether the pre-emptive slip control mode flag is currently set or equal to a non-zero value or has a logical state of "true", or whether it is necessary to enter pre-emptive slip control mode. If pre-emptive slip control mode is not required or the flag is reset or cleared, step 109 is followed by step 106. Alternatively, step 109 is followed by step 110 in which the controller 62 enters a preemptive slip control mode and the preemptive slip control flag is "set" or enabled, such as having a value of one or a logical state of "true".

There are several ways to determine, in step 109, whether a pre-emptive slip control mode is warranted. For example, in one non-limiting embodiment, the signals emanating from the sensors 64, 66 are subtracted and the difference is communicated to a one hertz low pass filter (not shown) in order to eliminate or reduce noise. Should the filtered difference continually exceed about two kilometers per hour for about one-half of a second, a pre-emptive slip condition is declared. Alternatively, a pre-emptive slip condition warranting a pre-emptive slip strategy may be declared when the value of "$Y_i(k)$" as calculated in the following equation, continually exceeds some torque transfer value, such as and without limitation, 0.50 or 50% for a period of about 200 milliseconds.

where: "$K_i$" is the gain multiplier of the latest sensed speed differential and in one non-limiting embodiment is equal to about five;

"$Y_i$" is the average percentage of the received torque being transferred to the driveshafts 34, 36 by the torque transfer assembly 60;

"e(k)" is the latest speed differential offset by a design slip allowance and, in one non-limiting embodiment, is equal to about 0.5 kilometers per hour; and "$Y_i(k-1)$" is the previous calculation of "$Y_i$".

In this step 110, the controller 62, due to the declaration of the pre-emptive mode within step 109, determines or senses that vehicle 12 is traveling upon a surface having a relatively low coefficient of friction (e.g., a coefficient of friction equal to or less than 0.5) and enters a preemptive slip control mode of operation. Step 110 is followed by step 112 in which the controller 62 utilizes several sensed values to determine whether there is some likelihood for slip to occur. For example, the controller 62 will use the acquired speed of the axles 4-17 in combination with the position of the accelerator member 55 and/or the throttle plate 53 in order to ascertain whether slip is likely (e.g., if there is a relatively low vehicular speed (about 20 miles per hour) and the position of the accelerator member 55 or the throttle plate 53 are greater than about half-way toward their respective "full" or maximum torque request position, the controller 62 will determine that slip is likely to occur.

If a slip has been determined to not likely to occur, step 112 is followed by step 116 in which the controller 62 determines whether the preemptive mode should be exited. If it is determined that the preemptive mode is to be exited, step 116 is followed by step 106 and the preemptive mode variable or flag is reset to zero or to a logically false state. Alternatively, step 116 is followed by step 112.

In one embodiment of the invention, it is determined to exit the preemptive mode when the vehicle 12 is traveling at a speed which is greater than about twenty-five kilometers per hour for at least thirty continuous seconds while the one hertz low pass filtered differential axle or wheel speed is less that about two kilometers per hour. Other strategies may be used in other non-limiting embodiments of the invention including, but not limited to, exiting the preemptive mode of operation after a certain time has elapsed after the controller 62 initially entered this mode of operation, such certain amount of time equaling, in one non-limiting embodiment, about thirty seconds.

It is to be understood that the present invention is not limited to the exact construction and method which has been delineated above, but that various changes and modifications may be made without departing from the spirit and the scope of the inventions as are more fully set forth in the following claims. Moreover, it should be appreciated that by employing the preemptive mode of operation after a slip condition occurs (e.g., after a surface having a relatively low coefficient of friction is sensed), the previously delineated drawbacks of the prior strategies may be overcome (e.g., the preemptive mode is used only when there exists a real likelihood of the occurrence of slip).

The invention claimed is:

1. A four wheel drive assembly for a vehicle having two pairs of wheels comprising a torque transfer assembly which receives torque and which has a first mode of operation in which said torque transfer assembly selectively increases torque to a slower pair of wheels upon an occurrence of a sensed slip condition, and which assembly further includes a preemptive mode of operation which occurs only after the first mode of operation has occurred, and in which preemptive mode the torque transfer assembly increases torque to a slower pair of wheels after determining that a slip condition is likely to occur on the basis of a speed of the vehicle and a position of one of an accelerator member and an engine throttle plate.

2. The four wheel drive assembly of claim 1 wherein said preemptive mode terminates after a certain period of time shall have elapsed without an occurrence of a sensed slip condition.

3. The four wheel drive assembly of claim 2 wherein said certain period of time comprises about thirty seconds.

4. The four wheel drive assembly of claim 3 wherein said preemptive mode again occurs upon a sensed occurrence of a slip condition after said certain period of time.

5. The four wheel drive assembly of claim 1 wherein said preemptive mode terminates upon an attainment of a certain vehicular speed and an attainment of a certain value for a predetermined attribute.

6. The four wheel drive assembly of claim 5 wherein said certain vehicular speed comprises a speed of about twenty-five kilometers per hour.

7. The four wheel drive assembly of claim 6 wherein said predetermined attribute comprises a difference in a speed of a first axle and a speed of a second axle.

8. The four wheel drive assembly of claim 7 wherein said certain value comprises about two kilometers per hour.

* * * * *